(12) United States Patent
Akabane

(10) Patent No.: US 6,754,156 B2
(45) Date of Patent: Jun. 22, 2004

(54) RECORDING APPARATUS FOR USE WITH OPTICAL RECORDING MEDIUM AND METHOD THEREOF

(75) Inventor: Shin Akabane, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/987,057

(22) Filed: Nov. 13, 2001

(65) Prior Publication Data
US 2002/0075782 A1 Jun. 20, 2002

(30) Foreign Application Priority Data
Nov. 10, 2000 (JP) .................................... 2000-344149

(51) Int. Cl.$^7$ ................................................ G11B 3/90
(52) U.S. Cl. ...................... 369/53.26; 369/112; 369/116
(58) Field of Search ........................... 369/47.49, 47.5, 369/47.51, 47.52, 53.26, 53.27, 116

(56) References Cited

U.S. PATENT DOCUMENTS 5,495,463 A * 2/1996 Akagi et al. ................ 369/116
5,742,566 A * 4/1998 Imai ............................ 369/116

* cited by examiner

Primary Examiner—Paul W. Huber
(74) Attorney, Agent, or Firm—Sughrue Mion, PLLC

(57) ABSTRACT

An optical recording apparatus includes a light source driving unit for driving the light source to emit the light beam; an emission light power detecting unit for detecting an emission light power from the light source; and a light power adjusting unit for controlling the light source driving unit based on a detected light power by the emission light power detecting unit to adjust the emission light power from the light source.

9 Claims, 5 Drawing Sheets

RECORDING APPARATUS FOR USE WITH OPTICAL RECORDING MEDIUM AND METHOD THEREOF

BACKGROUND OF THE INVENTION

1. Field of the Invention

The present invention relates to an apparatus and method for performing recordation by irradiating a light beam to a recording medium.

2. Description of the Related Art

It is necessary to control an emission power of a light source (laser diode or the like) to maintain a predetermined constant value during recording operation in order to achieve a satisfactory reproduction performance with a recording and/or reproducing apparatus or an optical disc drive for use with a recordable or rewritable optical disc, such as a DVD-R (Digital Versatile Disc-Recordable), a CD-R (Compact Disc-Recordable), a DVD-RW (DVD-Rewritable), and a CD-RW (CD-Rewritable).

Conventionally, the laser diode is driven by a driving current which is servo-controlled so as to maintain light power at a constant level when reading from an optical disc. When performing recording, the driving current is added with a current necessary to achieve a light power for recording while performing the servo control. FIG. 1 shows power characteristics of the laser diode which is dependent on the temperature of the laser diode. More specifically, the drawing shows a relation of light power (L) versus driving current (Id) in terms of the temperature of the laser diode as a parameter. Light power of the laser diode increases approximately linearly with respect to a driving current when the driving current is larger than an oscillation threshold value (Ith). As the temperature of the laser diode increases, the oscillation threshold value increases while slope efficiency or external differential quantum efficiency ($\eta d[W/A]$) representing a gradient of the characteristics curve decreases.

It is a problem in the above-described conventional driving method of the laser diode that recording light power varies because the external differential quantum efficiency of the laser diode varies as the temperature of the laser diode changes. It is another problem in the conventional driving method that the individual differences among laser diodes cause variations in light power during recording operation, because the temperature dependence of the laser diode characteristics varies from element to element.

Further, it is difficult to maintain the recording light power at the optimal value over time because the laser diode characteristics change with deterioration.

OBJECT AND SUMMARY OF THE INVENTION

The present invention has been made to overcome the above-described problems, and it is an object of the present invention to provide an optical recording apparatus capable of performing a light power control for recording with high accuracy in a stable manner regardless of a change in light emission efficiency of a light source with temperature or over time and a characteristics difference among individual light sources, and a method thereof.

To achieve the object, according to one aspect of the present invention, there is provided an optical recording apparatus for performing recording by irradiating a light beam emitted from a light source to a recording medium, which comprises a light source driving portion for driving the light source to emit the light beam; an emission light power detecting portion for detecting an emission light power from the light source; and a light power adjusting portion for controlling the light source driving portion based on a detected light power by the emission light power detecting portion to adjust the emission light power from the light source.

According to another aspect of the present invention, there is provided an optical recording apparatus for performing recording by irradiating a light beam emitted from a light source to a recording medium, which comprises a light source driving portion for driving the light source to emit a first light beam and a second light beam having a light power smaller than the light power of the first light beam; an emission light power detecting portion for detecting an emission light power from the light source; and a light power adjusting portion for adjusting the emission light power of the first light beam and the emission light power of the second light beam based on a detected light power of the first light beam by the emission light power detecting portion.

According to another aspect of the present invention, there is provided an optical recording apparatus for performing recording by irradiating a light beam emitted from a light source to a recording medium, which comprises a light source driving portion for driving the light source to emit a first light beam and a second light beam having a light power smaller than a light power of the first light beam; an emission light power detecting portion for detecting emission light power from the light source; and a light power adjusting portion for adjusting the emission light power of the first light beam based on a light power detection value of the second light beam by the emission light power detecting portion.

According to another aspect of the present invention, there is provided a method of an optical recording apparatus for performing recording by irradiating a light beam emitted from a light source to a recording medium, which comprises the steps of driving the light source to emit the light beam; detecting an emission light power from the light source; and adjusting the emission light power from the light source on the basis of a detected light power in the step of detecting an emission light power.

According to another aspect of the present invention, there is provided a method of an optical recording apparatus for performing recording by irradiating a light beam emitted from a light source to a recording medium, which comprises the steps of driving the light source to emit a first light beam and a second light beam having a light power smaller than the light power of the first light beam; detecting an emission light power from the light source; and adjusting the emission light power of the first light beam and the emission light power of the second light beam based on a detected light power of the first light beam in the step of detecting an emission light power.

DETAILED DESCRIPTION OF THE PREFERRED EMBODIMENTS

Figure 1:
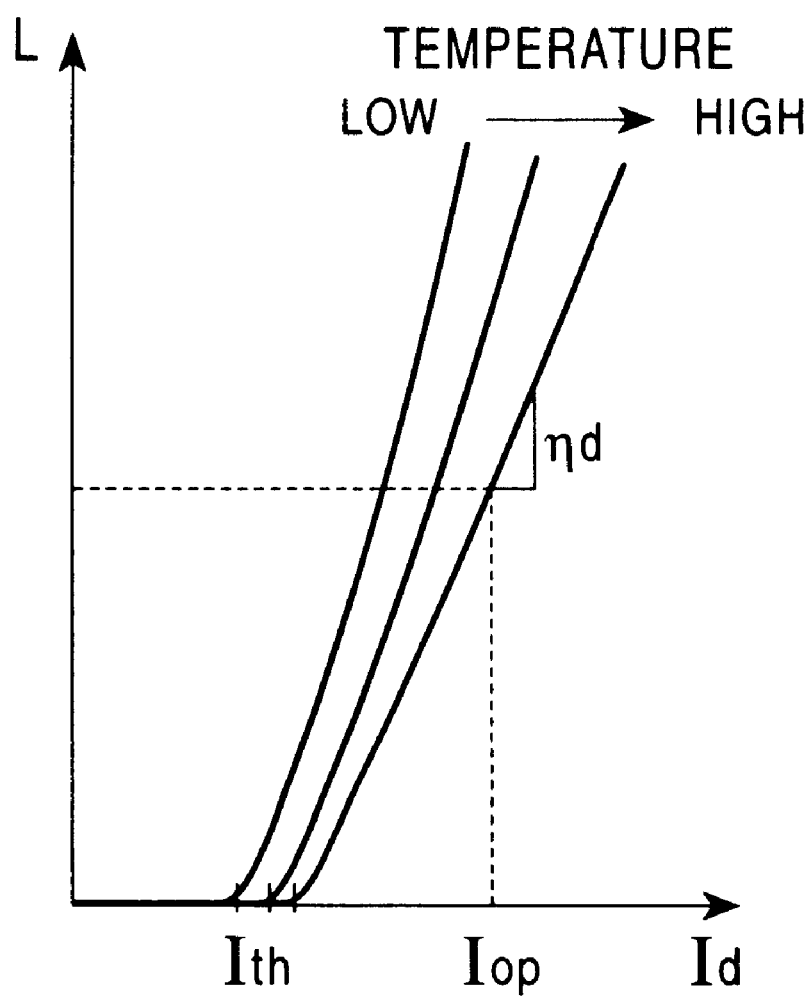
FIG. 1 shows temperature dependence of optical power characteristics of a laser diode wherein a relation of light power (L) versus a driving current (Id) is illustrated while using a temperature as a parameter.

Preferred embodiments of the present invention will hereinafter be described in detail with reference to the accompanying drawings, in which substantially equivalent components are labeled with like reference numerals for simplicity of description.

First Embodiment

Figure 2:
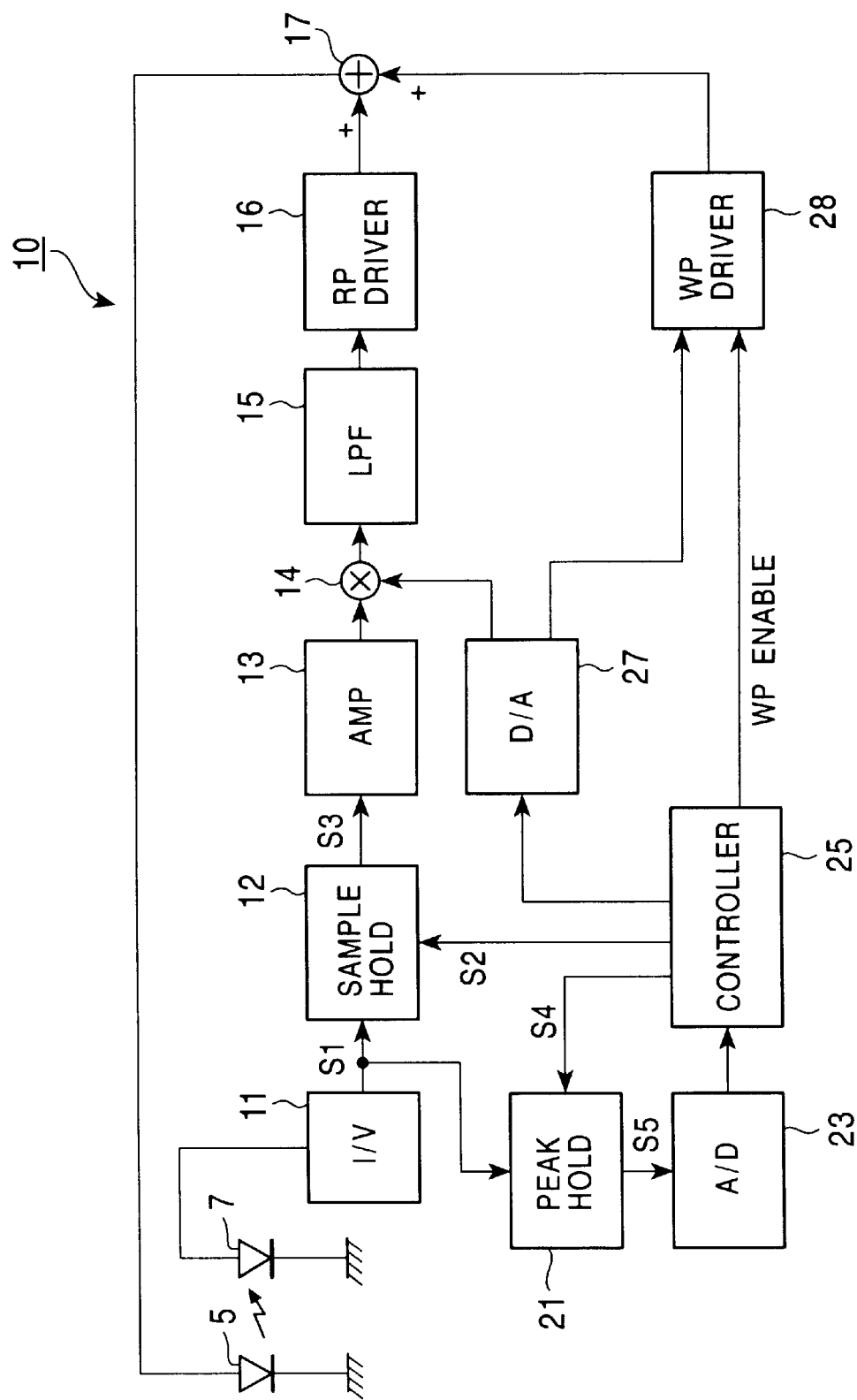
FIG. 2 is a block diagram illustrating a configuration of a light power control unit in an optical recording apparatus according to a first embodiment of the present invention.
Figure 3:
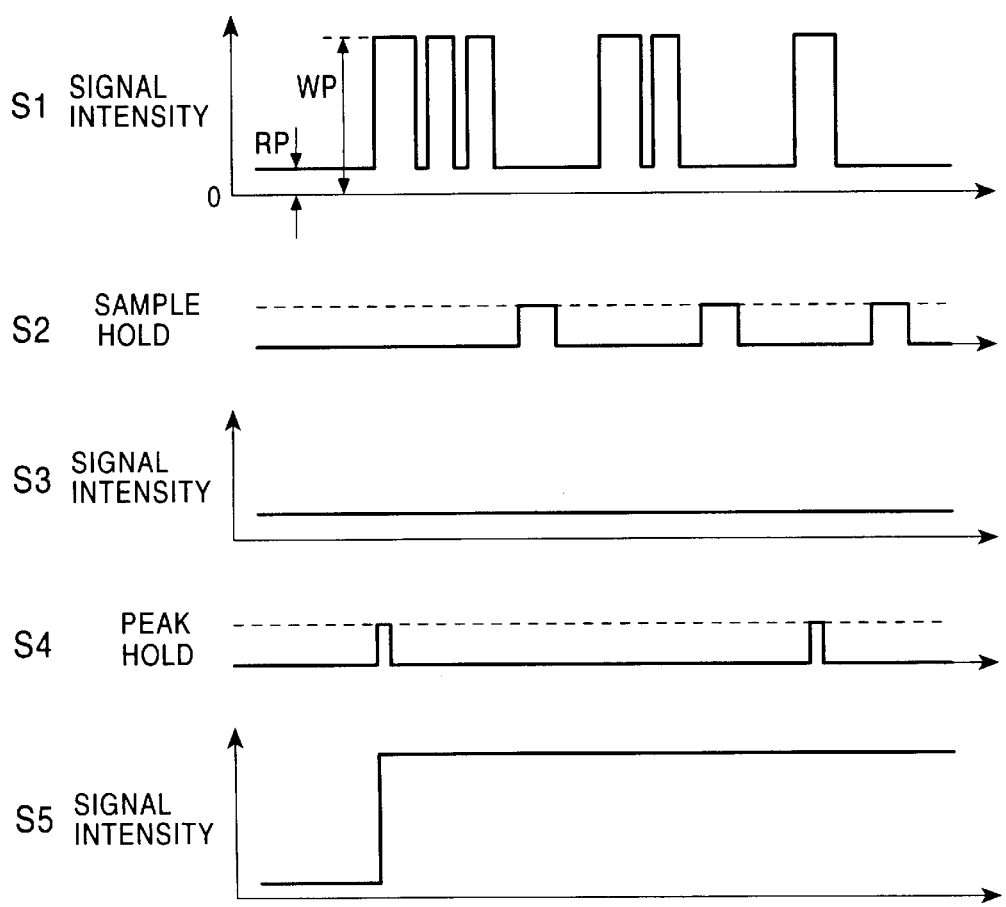
FIG. 3 is a time chart illustrating an operation of the light power control unit of FIG. 2.

FIG. 2 is a block diagram illustrating a configuration of a light power control unit 10 in an optical recording apparatus according to a first embodiment of the present invention, and FIG. 3 is a time chart illustrating an operation of the light power control unit 10.

With reference to FIG. 2, a laser diode 5 serving as a light source is provided in an optical pick-up(not shown). The laser diode 5 emits a beam of laser light irradiated to an optical disc, such as a DVD-R and a CD-R. Also, a light detector 7 (front monitor detector: FMD) detects power (light power) of light emitted to the optical disc from the laser diode 5 (that is, front output light). A current signal representing light power detected by the front monitor detector 7 is converted to a voltage signal (detection signal S1 of FIG. 3) by a current-to-voltage (I/V) converter 11.

The detection signal S1 is supplied to a sample hold circuit 12, so that sampling of the detection signal S1 is performed based on a sampling control signal S2 from a controller 25. As shown in FIG. 3, the sampling control signal S2 has a sampling pulse for detecting a read power (RP) used for reading an optical disc. A read-power (RP) signal S3 generated by the sample hold circuit 12 and representing light power for reading is amplified by an amplifier 13. The amplified read-power (RP) signal is supplied to a multiplier 14.

The above-mentioned detection signal S1 is also supplied to a peak hold circuit 21, and a peak value is held at the timing specified by a peak hold timing control signal S4 from the controller 25. In other words, a peak hold signal S5 with a magnitude corresponding to the peak value of a write power (WP) is generated. The peak hold timing can be any time interval, provided that variance, such as a change in temperature, can be detected. The peak value thus held is maintained until it is updated in the following peak hold operation.

The peak hold signal S5 generated by the peak hold circuit 21 is converted into a digital signal in an analog-to-digital (A/D) converter 23 to be supplied to the controller 25 that controls an overall operation of the light power control unit 10. The controller 25 generates a control signal (that is, a light power adjusting signal) for adjusting front output light from the laser diode 5 to maintain a constant value on the basis of the received peak hold signal S5. The light power adjusting signal, which includes signals for adjusting the read-power and the write-power, is supplied to a digital-to-analog converter 27.

A read-power adjusting signal converted into an analog signal in the D/A converter 27 is supplied to the multiplier 14. The analog light-power adjusting signal is multiplied by the amplified read-power signal. In other words, the read-power (RP) signal is adjusted according to variance of the front output power from the laser diode 5. After high frequency components are removed from a read-power adjusting signal generated by the multiplier 14 through a low-pass filter (LPF), the read-power adjusting signal is supplied to a read-power driver (RP driver) 16, and a read-light driving current is generated.

On the other hand, a write-power adjusting signal converted into an analog signal in the D/A converter 27 is supplied to a write-power driver (WP driver) 28. The WP driver 28 adjusts a driving current at a predetermined value (that is, a driving current computed from the write-power and a predetermined external differential quantum efficiency) according to the write-power adjusting signal, and outputs the result. Also, the WP driver 28 is supplied with a WP enable signal corresponding to an input data signal from the controller 25. The driving current for writing is added to a driving current for reading from the PR driver 16 in an adder 17 to be supplied to the laser diode 5.

As has been described, the front output light from the laser diode 5 is monitored and the emission light power for writing is adjusted based on the front output power. Hence, it is possible to perform a light power control with high accuracy in a stable manner even for recording regardless of variance in light emission efficiency of the laser diode 5.

The above-described embodiment is an example where the present invention is applied to a recordable optical disc, such as a DVD-R. It should be appreciated, however, that the present invention can be also applied to a rewritable optical disc, such as a DVD-RW and a CD-RW.

Second Embodiment

Figure 4:
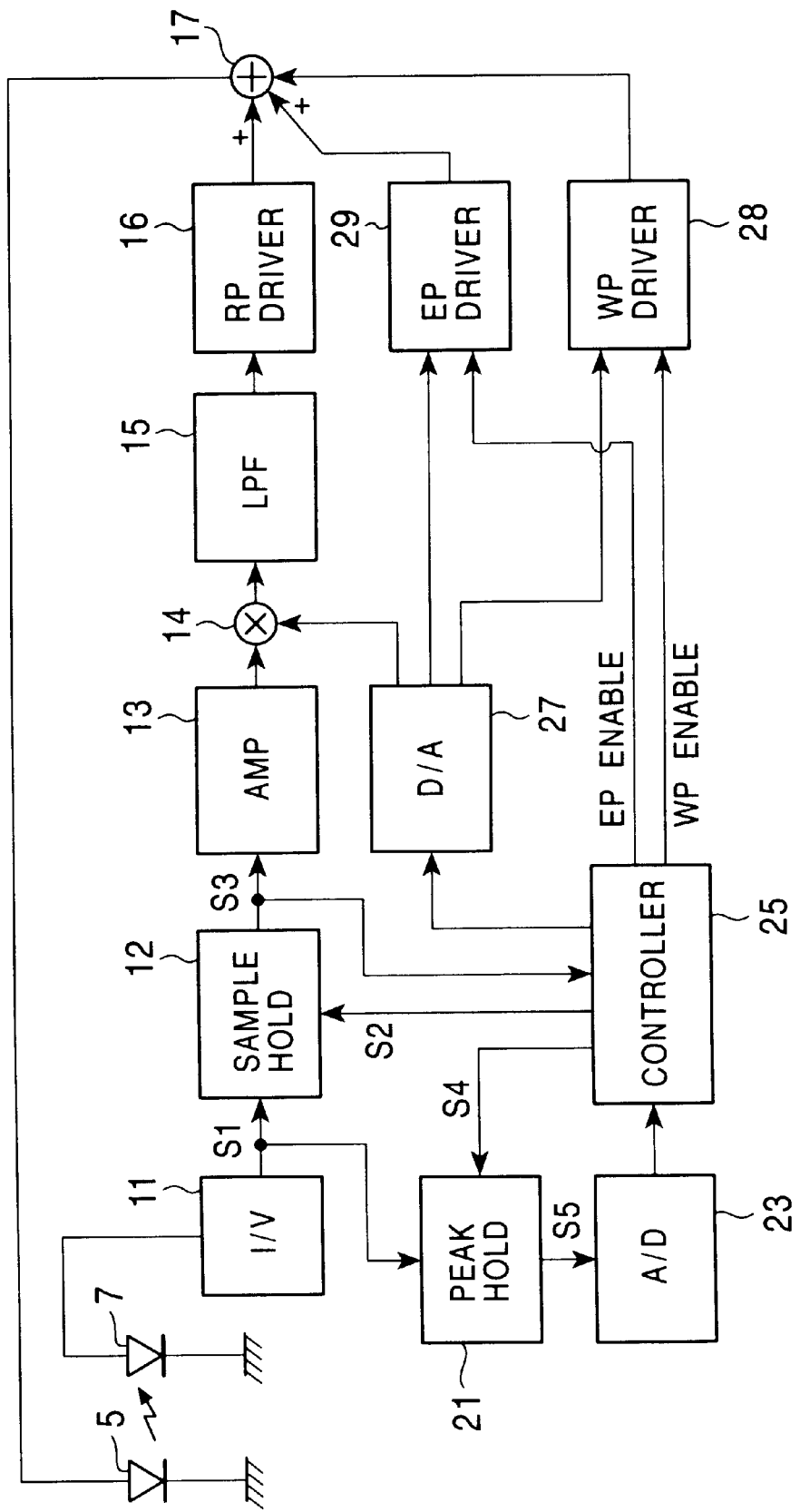
FIG. 4 is a block diagram illustrating a configuration of a light power control unit in an optical recording apparatus according to a second embodiment of the present invention.
Figure 5:
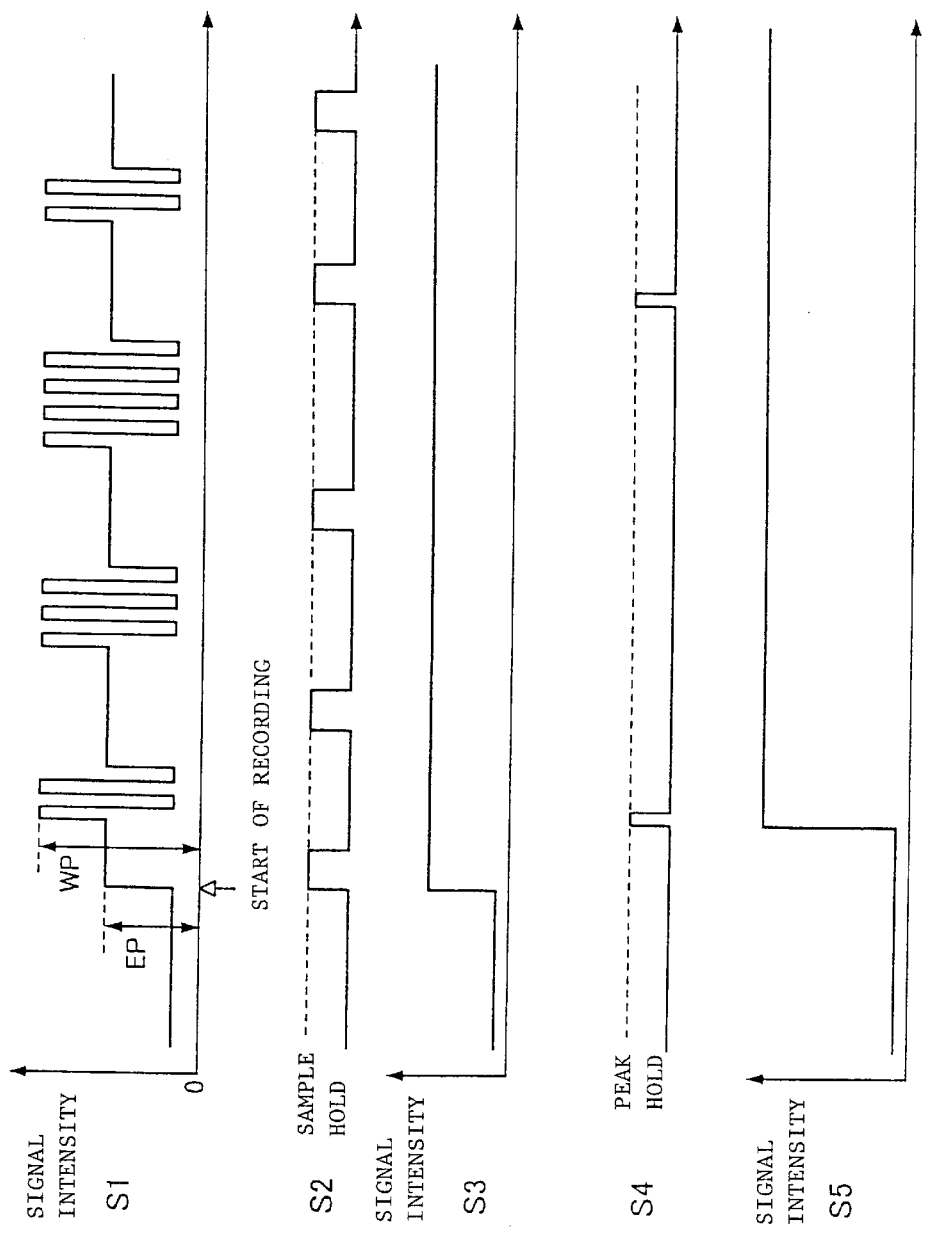
FIG. 5 is a time chart illustrating an operation of the light power control unit of FIG. 4.

FIG. 4 is a block diagram illustrating a configuration of a light power control unit 10 in an optical recording apparatus according to a second embodiment of the present invention. FIG. 5 is a time chart illustrating an operation of the light power control unit 10.

The present embodiment describes one example case where the present invention is applied to a recording apparatus of an optical disc, such as a DVD-RW and a CD-RW. More specifically, a light source 5 emits, in addition to a read-light and a write-light, a light beam having a light power different from those of the read-light and the write-light.

As shown in FIG. 4, the light power control unit 10 of the present embodiment is different from that of the first embodiment in that, for example, there is additionally provided with an erase-power (EP) driver 29 for allowing emission of a light beam having a light power to erase a content recorded on an optical disc. The following description will describe an operation of the light power control unit 10 of the present embodiment with reference to the time chart of FIG. 5.

Like in the first embodiment, a current signal representing a light power detected by a front monitor detector 7 is converted to a voltage signal (i.e., detection signal S1 of FIG. 5) by a current-to-voltage (I/V) converter 11. The detection signal S1 includes, besides signals representing the read-power and the write-power, a signal representing an erase-power with an intermediate magnitude of those of the read-power and the write-power. A sample hold circuit 12 holds a sampling value of the detection signal SI based on a sampling control signal S2 supplied from a controller 25. As shown in FIG. 5, the sampling control signal S2 includes a sampling pulse for detecting an erase-power (EP). An erase-power (EP) signal (sample hold signal) S3 having undergone sample holding by the sample hold circuit 12 is amplified by an amplifier 13 to be supplied to a multiplier 14. The erase-power (EP) signal S3 generated by the sample hold circuit 12 is also supplied to the controller 25.

The above-mentioned detection signal S1 is also supplied to a peak hold circuit 21, and a peak-value during a write operation is held by a peak-hold timing control signal S4 supplied from the controller 25. A time interval to update the peak value can be any length, provided that variance, such as a change in temperature, can be detected. A peak hold signal S5 is supplied to the controller 25 through an analog-to-digital (A/D) converter 23.

The controller 25 generates a light power adjusting signal for making an adjustment to maintain a front output power from the laser diode 5 at a constant value based on the magnitude of the received peak hold signal S5. The light power adjusting signal is generated for adjusting the read-power, the write power and the erase-power. The light power adjusting signal is supplied to a digital-to-analog (D/A) converter 27. The controller 25 generates a light power adjusting signal or a peak hold signal that instructs to maintain the write-power (WP) level at a constant value. Also, the controller 25 makes a similar adjustment as to the erase-power (EP) level by using a ratio of set values of the erase-power (EP) level and the write-power (WP) level.

The erase-power adjusting signal converted into an analog signal in the D/A converter 27 is supplied to an erase-power driver (EP driver) 29. The driving signals from each of the PR driver 16, the EP driver 29, and the WP driver 28 are added up in an adder 17. The resultant driving signal is supplied to the laser diode 5.

As has been described, the front output power from the laser diode 5 is monitored, and emission light power for writing is adjusted based on the front output power. Hence, it is possible to perform a light power control with high accuracy in a stable manner even for recording operation regardless of variance in light emission efficiency of the laser diode 5.

As a modified example of the present embodiment, an emission light power for writing and/or reading may be adjusted based on the peak hold value of the erase-power instead of the peak value of the write-power.

As described above, according to the present invention, an optical recording apparatus and method can be provided which is capable of performing a light power control for recording with high accuracy in a stable manner regardless of a change in light emission efficiency of a light source with temperature or over time and a characteristics difference among individual light sources, and a method thereof.

The invention has been described with reference to the preferred embodiments thereof. It should be understood by those skilled in the art that a variety of alterations and modifications may be made from the embodiments described above. It is therefore contemplated that the appended claims encompass all such alterations and modifications.

This application is based on Japanese Patent Application No.2000-344149 which is hereby incorporated by reference.

What is claimed is:

1. An optical recording apparatus for performing recording by irradiating a light beam emitted from a light source to a recording medium, comprising:

a light source driving portion for driving said light source to emit a first light beam and a second light beam having a light power smaller than the light power of said first light beam;

an emission light power detecting portion for detecting an emission light power from said light source; and a light power adjusting portion for adjusting the emission light power of said first light beam and the emission light power of said second light beam based on a detected light power of said first light beam by said emission light power detecting portion.

2. An optical recording apparatus according to claim 1, wherein:

said emission light power detecting portion includes a peak hold circuit for holding a peak power value of said first light beam; and said light power adjusting portion adjusts the emission light power of said light source based on the peak power value.

3. An optical recording apparatus according to claim 2, wherein:

said first light beam has a light power for use with recording on the recording medium; and said second light beam has a light power for use with erasing for the recording medium.

4. An optical recording apparatus according to claim 2, wherein:

said first light beam has a light power for use with recording on the recording medium; and said second light beam has a light power for use with reading from the recording medium.

5. An optical recording apparatus for performing recording by irradiating a light beam emitted from a light source to a recording medium, comprising:

a light source driving portion for driving said light source to emit a first light beam and a second light beam having a light power smaller than a light power of said first light beam;

an emission light power detecting portion for detecting emission light power from said light source; and a light power adjusting portion for adjusting the emission light power of said first light beam based on a light power detection value of said second light beam by said emission light power detecting portion.

6. An optical recording apparatus according to claim 5, wherein:

said first light beam has a light power for use with recording on the recording medium; and said second light beam has light power for use with erasing from the recording medium.

7. A method of an optical recording apparatus for performing recording by irradiating a light beam emitted from a light source to a recording medium, comprising the steps of:

driving said light source to emit a first light beam and a second light beam having a light power smaller than the light power of said first light beam;

detecting an emission light power from said light source; and adjusting the emission light power of said first light beam and the emission light power of said second light beam based on a detected light power of said first light beam in the step of detecting an emission light power.

8. A method according to claim 7, wherein the step of adjusting the emission light power adjusts to maintain the emission light power of said first light beam substantially at a constant level.

9. A method according to claim 7, wherein:

the step of detecting an emission light power includes the step of holding a peak power value of said first light beam; and the step of adjusting the emission light power adjusts the emission light power from said light source on the basis of the peak power value.

* * * * *